United States Patent Office 3,522,124
Patented July 28, 1970

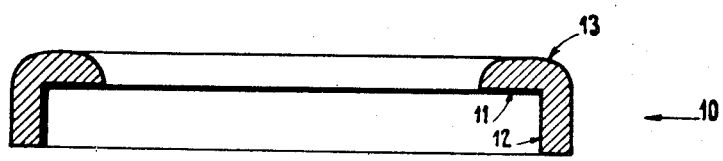
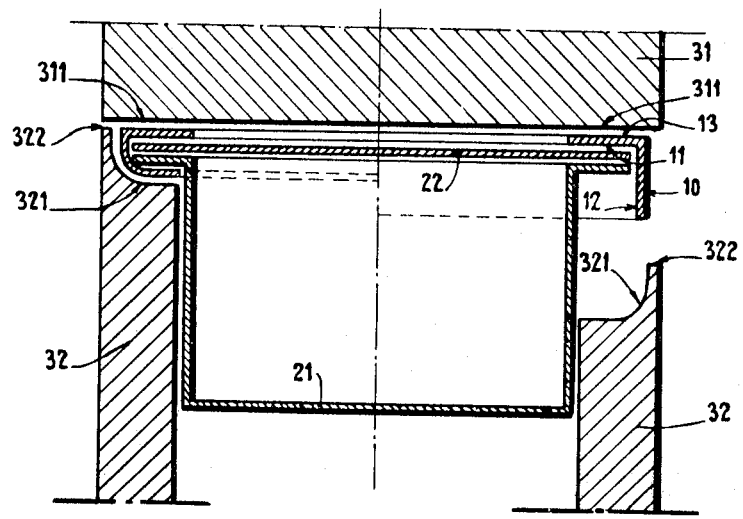
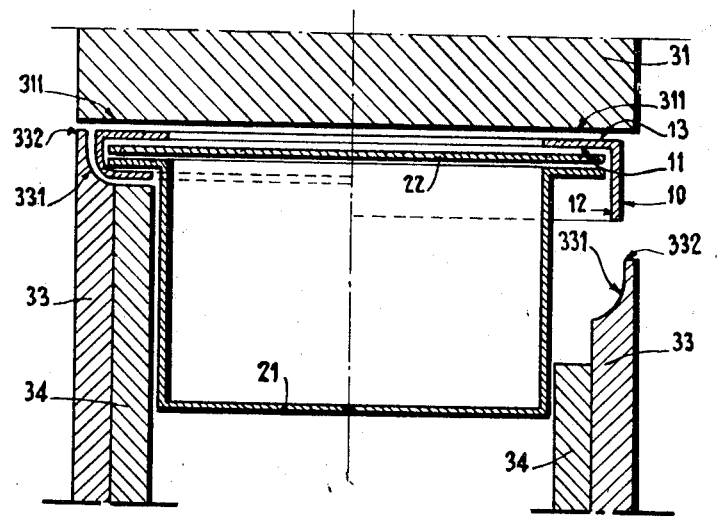

3,522,124
METHOD FOR PRODUCING A SEALING JOINT
BETWEEN THIN SHEETS
Jacques Peyraud, Cachan, Val de Marne, France, assignor to Societe Centrale des Emballages Aluminum "Cebal," Paris, France
Filed Nov. 17, 1966, Ser. No. 595,159
Claims priority, application France, Nov. 19, 1965, 39,112
Int. Cl. C09j 5/00
U.S. Cl. 156—306     2 Claims

ABSTRACT OF THE DISCLOSURE

Apparatus and method for producing a sealing joint between thin sheets comprising providing a blank of thermoplastic material having a shape and dimension corresponding to the shape and dimension of the sheets to be joined, heating the blank to a plastic state, positioning the blank about the edges of the sheets to be joined in an apparatus comprising a first element having a working surface to engage the segment of the blank overlying the edge portion of the sheets and a second element having a curvilinear concave section whereby the segment of the blank alongside the edges of the sheets is folded onto the side of the sheets opposite the segment overlying the edge portion to secure the edges of the sheets therebetween when the first and second elements are displaced relative to each other.

---

This invention relates to the joinder of thin sheet material, such as may be formed of metals, alloys, combinations of various metals and alloys, plastics, and metal-clad plastics or laminates, and it relates more particularly to the method and apparatus for effecting same and to products produced by same.

Assembly of sheet stock, as by crimping, welding or by molding with a plastic sealing material to effect a sealing joint, in the production of metal or plastic containers, are well known.

Crimping requires the use of delicate adjustments and relatively complicated and costly apparatus and the crimping processes have not been found to be suitable for use with very thin sheet stock.

Welding presupposes the use of bulky automatic machines and the very careful preparation of the surfaces to be joined in sealing relation. It is a relatively slow procedure which imposes limitations on the rate of output and makes it necessary to provide for a plurality of welding units to achieve a high rate of production.

Molding can be used for the assembly of thin sheets to effect a sealing joint but, like welding, it requires the use of expensive automatic machines having a relatively long working cycle and the necessity to orient the sheet of the synthetic plastic material in a predetermined direction relative to the edges of the sheets throughout the injection cycle and this presents a complicated problem which oftens leads to excessive scrap.

It is an object of this invention to provide a new and improved technique for the assembly of thin sheets to effect a sealing joint therebetween, in which the process makes use of relatively simple and inexpensive machines, which permits a high rate of production and which provides a perfectly sealed joint, and it is a related object to provide an apparatus for use in the practice of the process and to produce new and improved products therewith.

These and other objects and advantages of this invention will hereinafter appear and for purposes of illustration, but not of limitation, embodiments of the invention are shown in the accompanying drawings, in which—

FIG. 1 is a sectional elevational view through a blank employed in the practice of this invention;

FIG. 2 is a sectional elevational view showing the relative position of the elements of a machine and sheets with the portion to the right showing the elements at the start of the operation and the portion to the left showing the elements upon completion of the operation;

Figure 4:
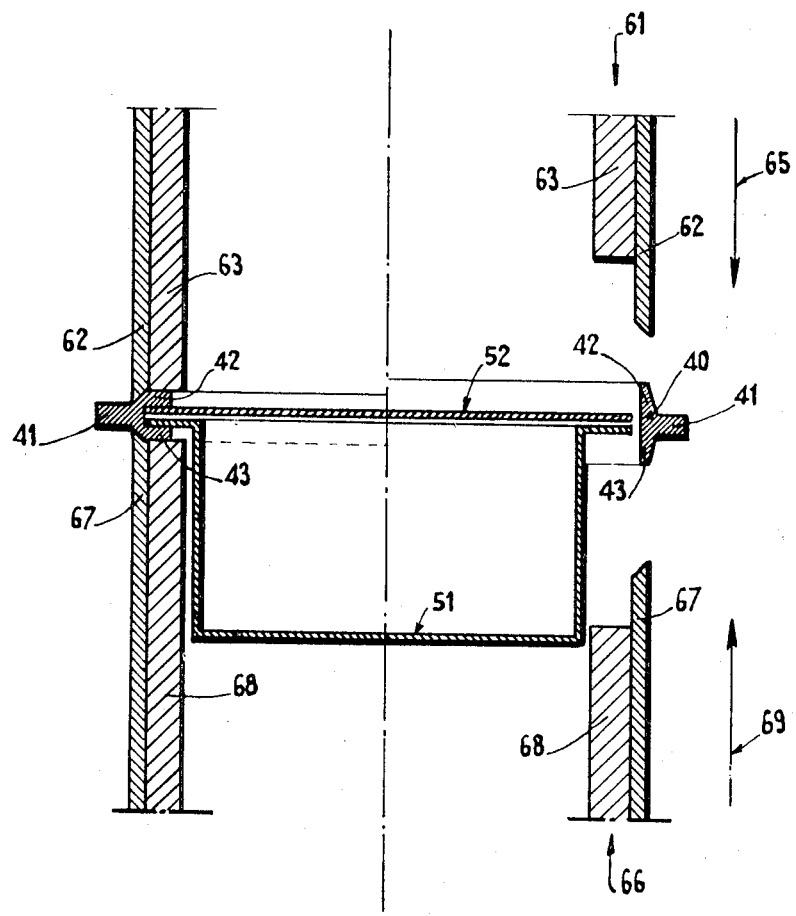

FIG. 3 is a sectional elevational view similar to that of FIG. 2 showing a modification in the apparatus; and FIG. 4 is a sectional elevational view of a still further modification in an apparatus embodying the features of this invention in which the portion to the right illustrates the relative position of elements when in open position and the portion to the left illustrates the position of the elements when in closed position.

In accordance with the practice of this invention, use is made of a blank 10 formed of a thermoplastic material having a cross-section comprising an angle at least equal to a right angle and a shape adapted to correspond with the periphery of the edges of the sheets to be joined so as to fit about the sheets to be assembled. The blank is heated to an elevated temperature sufficient to enable plastic deformation for shaping or molding and then it is molded over the sheets with an apparatus comprising basically two elements which substantially surround the blank and are adapted to close the blank over the sheets as the elements are displaced under pressure in the direction one towards the other.

In the instance wherein the cross-section of the blank is substantially of right angle, the apparatus of this invention comprises a first element 31 positioned opposite the joint to be produced and which is formed with a peripheral working surface representing the cross-section to be given to the portion of the joint intended to come in contact therewith and a second element 32 having a concave end section, the upper portion of which is situated outwardly of the joint so that when the two elements are displaced in the direction towards one another, one of the portions of the blank is engaged by the peripheral working surface of the first element while other portions at the side opposite the first element are folded over by the upper portion of the second element whereafter the entire blank is compressed between the two elements to form the sealing joint with the edges of the sheets.

A particularly important application for the assembly of thin sheets by joints of synthetic plastic material, produced in accordance with the practice of this invention, is in the production of cans, and more particularly containers for foodstuffs and the like in which the containers are formed of sheets of aluminum. This particular application requires a low cost operation which presupposes simple and inexpensive machines operating at a high production rate and the fabrication of containers or cans having perfectly sealed joints.

In one modification of the invention, the basic item comprises a prefabricated unitary blank 10 formed of a thermoplastic material, such as polyethylene, polypropylene or the like, having a cross-section comprising two rectilinear portions 11 and 12 extending substantially at right angles one from the other, as shown in FIG. 1.

The blank is heated to a temperature sufficient to reduce the thermoplastic material to the plastic stage while supporting the blank to prevent undesirable dimensional change or deformation.

Heating is preferably carried out in a circulating air furnace for a relatively short time, such as about one minute. In order to insure the success of this operation, it is desirable to make use of a heating fluid having adequate thermal conductivity for transmission to the plastic material at a high rate. For this purpose, air has been found particularly suitable. The temperature to which the blank is heated will depend somewhat upon the synthetic plastic material employed and can be derived by the skilled in the art from the tables on softening point temperatures for the particular resinous material of which the plastic is formed. In the case of polypropylene, the blank can be heated to a temperature within the range of 140–180° C.

The blank 10 is removed from the heating furnace and positioned about the edges of the sheets to be assembled. This transposition is effected as rapidly as possible to minimize the amount of heat loss. In the illustrated modification, the heated blank is positioned about the lid 22 and the flange extending outwardly from the upper edge of the can 21 filled with foodstuffs. The transportation of the blank from the furnace to about the edges of the sheets to be joined can be effected by any known means, such as mechanical, hydraulic and preferably automatic means.

The can with the blank are introduced into an apparatus embodying the features of this invention, as illustrated in FIG. 2. A first element 31 in the form of a flat platen or plate is positioned with its working surface 311 adjacent the top side 13 of the blank 10. The underlying face of the working surface corresponds to the cross-section desired to be given to the corresponding underlying portion of the joint.

A second element 32 has a curvilinear concave surface 321, the upper portion 322 of which is positioned alongside the outer side of the blank 10. When the one or the other or both of the elements 31 or 32 are displaced for movement in the direction towards each other, the upper portion 13 of the blank is engaged by the working surface 311 of the first element 31 while the depending portion of the blank making up the face 12 is engaged by the curvilinear portion 321 for folding same inwardly and upwardly against the underside of the sheets and then to clamp the folded portions against the underside of the sheets to be assembled. Thus the joint shown in the left hand portion of FIG. 2 is obtained.

The can can be introduced into the first element with the blank already provided thereon or it can be introduced to the first element and thereafter provided with the blank.

The elements are retained in their closed sealing position under pressure between the elements 31 and 32 for a time sufficient to reduce the temperature of the molded blank to set the elastomeric material and to insure that the elements retain their form after the assembly is removed thereby to maintain the desired sealing relationship at the joint.

A number of modifications can be made without departing from the framework of the invention.

The working surface 311 of the first element 31 may be of various shapes or forms. If the blank shown in FIG. 1 is used, the working surface 311 can be formed with a concavity in the form of a semi-torus to match the surface 13 of the blank. The surface 311 need not be identical in contour to the surface 13 of the blank since it is the surface 311 which gives final shape to the joint.

By way of further modification, it will be apparent that it is possible to carry out the deformation of the blank in more than one pass. For example, with the apparatus shown in FIG. 3, it is possible to carry out the operation in two passes. In such event, the tool 32 is subdivided into two parts, namely, an outer portion 33 having an end 331 which is concave and in which the upper portion 332 is situated alongside the blank 10, and an inner portion 34 which slidably engages the internal surface of the outer portion 33.

In operation of the foregoing modification, the blank is closed in two stages. During the first stage, the movement of the first element 31 and/or the outer element 33 in the direction to bring them together first brings the upper surface 13 of the blank against the working surface 311 and then the portion 12 of the blank is engaged by the concave portion of the element 33 to fold it under. During the second stage, the inner portion 34 is displaced upwardly relative to the outer portion 33 into engagement with the inturned lower end portion of the blank strongly to press the blank onto the portions of the assembled sheets positioned therebetween.

The second element 32 may be formed of more than two parts with the intermediate portions operated successively after movement of the outer element 33 and the innermost element into engagement with the aligned portions of the blank.

The central region of the element 31 may be of a shape other than the plain shape illustrated. For example, it can be concave in order to accommodate a curved lid. It can even be recessed to permit the assembly of two cans 21 with one can inverted over the other.

In another modification, illustrated in FIG. 4, the basic element is a blank 40 prefabricated of thermoplastic material in the form of a cylindrical section having a flat inner face of substantially cylindrical shape and a rim 41 which extends radially outwardly from the outer peripheral surface midway between the ends. The foldable portions corresponding to the element 12 in the blank shown in FIG. 1 find their correspondence in the lugs 42 and 43 which extend one from the other at an angle of about 180° thereby corresponding to the sum of the two right angles. Thus, in addition to the rim 41, which enables the blank to be gripped and held in place, the blank includes the two lugs, namely the upper lug 42 and the lower lug 43.

In use, the blank 40 is first heated, as previously described, and then it is placed about the edges of the sheets in position to be assembled. In the case of a can containing foodstuffs, the blank 40 is placed onto the can 51 which has previously been filled and provided with its lid 52.

The can and the blank are then introduced together into an apparatus formed of a pair of cooperating tools 61 and 66, generally of cylindrical shape. Each tool portion has a folding element 62 and 67 respectively, and a clamping element 63 and 68 respectively, each of which is movable into and out of clamping position.

The two folding elements 62 and 67 are formed with a cam edge in vertical alignment with the upper and lower edges respectively of the lugs 42 and 43 whereby the lugs are folded inwardly against the upper and lower surfaces of the assembled sheets to engage the sheets therebetween as the sections 62 and 67 are displaced in the direction of the arrows into engagement with the blank. The deformed lugs 42 and 43 are clamped about the opposite sides of the assembled sheets as the clamping elements 63 and 68 are displaced into engagement therewith in clamping position, as illustrated by the left hand portion in FIG. 4.

It is possible, with the method and apparatus described, to assemble more than two sheets to effect a sealing relationship therebetween. For example, it is possible to assemble an external container of considerable height and an internal container whose diameter and height are less than that of the outer container with a common lid thereby to make it possible to present two products within a single package which can be mixed at the moment of use.

It will be understood that changes may be made in the details of construction, arrangement and operation without departing from the spirit of the invention, especially as defined in the following claims.

What is claimed is:

1. In the method for the joinder of edge portions of sheet material into a sealing joint, the steps of arranging the sheets with the edge portions to be joined in aligned superposed relation, providing a blank of thermoplastic material having a shape and dimension to correspond with the shape and dimension of the edge portions to be joined and having an inner surface formed of segments extending at an angle equal to about a right angle therebetween, heating the blank to a plastic stage, positioning the blank about the edges of the sheets to be joined with one segment alongside the edges and the other overlying the edges and positioning the blank between a working surface and a surface having a curvilinear concave section and then displacing said surfaces relative to each other to fold over the segments alongside the edges onto the side of the sheets opposite the other segment to position the edges of the sheets therebetween, and to press the segments in the direction towards each other against the opposite sides of the assembled sheets while setting the thermoplastic material to fix the sealed joint.

2. The method as claimed in claim 1 in which the blank is formed with an inner surface in which the segments extend at an angle of about 180° and in which both segments are folded over with one folded onto one side of the assembled sheets and the other folded onto the other side of the assembled sheets to engage the edge portions of the assembled sheets therebetween.

References Cited
UNITED STATES PATENTS

| | | | |
|---|---|---|---|
| 2,393,347 | 1/1946 | Stuart et al. | 93—39.1 |
| 2,801,946 | 8/1957 | Evenblij | 93—39.1 |
| 3,346,435 | 10/1967 | Beck | 156—423 |

FOREIGN PATENTS 20,188 1/1905 Sweden.

REUBEN EPSTEIN, Primary Examiner

U.S. Cl. X.R.

53—42; 156—217, 480